United States Patent [19]

Fattore et al.

[11] 3,901,938
[45] Aug. 26, 1975

[54] PROCESS FOR THE AMMOXIDATION OF PROPYLENE

[75] Inventors: Vittorio Fattore; Bruno Notari, both of San Donato Milanese, Italy

[73] Assignee: Snam Progetti S.p.A., San Donato Milanese, Italy

[22] Filed: Feb. 28, 1973

[21] Appl. No.: 336,703

[30] Foreign Application Priority Data
Mar. 1, 1972 Italy.................................. 21248/72

[52] U.S. Cl............ 260/465.3; 252/439; 260/604 R; 260/680 E
[51] Int. Cl.².................................... C07C 120/14
[58] Field of Search................. 260/465.3; 252/439

[56] References Cited
UNITED STATES PATENTS

| | | | |
|---|---|---|---|
| 3,347,899 | 10/1967 | Caporali et al. | 260/465.3 |
| 3,392,189 | 7/1968 | Eden | 260/465.3 |
| 3,641,102 | 2/1972 | Reulet et al. | 260/465.3 |

*Primary Examiner*—Joseph P. Brust
*Attorney, Agent, or Firm*—Ralph M. Watson

[57] ABSTRACT

This invention provides a new catalyst and process for the oxidation and ammoxidation of olefins. The catalysts are of the formula:

$$TeTi_n Mo_p P_q X_m O_r$$

wherein X is an element selected from groups IB, IIB, IIIA, IIIB, IVB, VIIB and VIII of the Periodic Table of Elements.

7 Claims, No Drawings

PROCESS FOR THE AMMOXIDATION OF PROPYLENE

The present invention relates to new catalysts for the ammoxidation and oxidation of olefinic hydrocarbons, to their preparation and to their use for the synthesis of unsaturated nitriles, unsaturated aldehydes and conjugate dienes starting from olefines.

From the art catalysts are known for the oxidation and ammoxidation of olefines; the most important among them are the ones comprising oxygen containing compounds formed by at least two elements among which Mo-Bi, Sb-U, Sb-Sn, Sb-Fe.

It is moreover known from U.S. Pat. No. 3,164,627 that tellurium in oxidized form has been proposed for the production of unsaturated nitriles by reacting olefines, oxygen or a gas containing oxygen and ammonia.

U.S. Pat. No. 3,164,626 discloses also the use of tellurium in mixture with oxides of other metals as catalyst for the ammoxidation reaction. Not always these catalysts give satisfying conversion, selectivity and productivity values as regards the desired product and this involves, besides, expensive processes for the separation and removal of the by-products.

It has now been found, and this is a first object of the invention, a catalyst capable to carry out the synthesis of unsaturated nitriles, particularly acrylonitrile with high selectivity and conversion.

A second object of the invention is a process for the preparation of the catalysts having the above defined properties.

A third object of the invention is the use of the above mentioned catalyst in the ammoxidation of olefines in order to obtain unsaturated nitriles.

A fourth object of the invention is the use of the same catalyst in the partial oxidation of olefines in order to obtain unsaturated aldehydes.

A fifth object of the invention is the use of the same catalyst in the oxidative dehydrogenation of olefines in order to obtain conjugate dienes.

All these and other objects are realized according to the present invention which furnishes a catalyst comprising essentially tellurium, titanium and molybdenum, which catalyst can be schematically represented by the following formula $TeTi_nMo_pP_qX_mO_r$ wherein X is an element selected among those belonging to the following groups of the periodic system: IB, IIB, IIIA, IIIB, IVB, VIIB and VIII. Particularly preferred are silver, zinc, cadmium, aluminium, cerium, lanthanum, zirconium, manganese, iron, cobalt and nickel.

In the aforesaid formula the indices are comprised within the following ranges:

| | |
|---|---|
| m between 0 | and 0.3 |
| n between 1 | and 15 |
| p between 0.05 | and 0.4 |
| q between 0 | and 0.3 | while $r$ represents the value necessary for satisfying the valence with which the different elements are present in the formula.

The X-rays analysis reveals that the catalyst results to be formed by complex oxygen containing compounds of the elements which are part of the composition. There is no evidence of the existence of free molybdates, molybdenum oxides and tellurium oxides.

The catalyst of the present invention can be prepared starting from usually available raw materials.

As raw materials for introducing tellurium, an advantageous use is made of telluric acid, tellurium oxide, metallic tellurium.

According to the selected compound it will be sufficient either to dissolve the same in water (this is the case of telluric acid) or to treat the same with mineral acids, for instance nitric acid, and/or oxidizing agents, for instance hydrogen peroxide, as in the case of tellurium dioxide or metallic tellurium.

As raw material containing titanium use is made of titanium dioxide in the form of rutile or anatase, trichloride and tetrachloride.

The chlorides are transformed into oxides by precipitation with ammonia. Molybdenum is used in the preferred forms of ammonium molybdate or paramolybdate, which are soluble in water.

As to phosphorus use is made of concentrated solutions of phosphoric acid while as to the other elements which may belong to the catalyst, use is made of soluble salts of same as nitrates, acetates, carbonates and bicarbonates.

The preparation procedure depends on the selected type of raw materials and anyhow comprises a series of operations well know to the skilled in the art as precipitation, co-precipitation, filtration, drying, atomization, calcination, extrusion and tabletting.

The preferred procedure of the operation comprises dissolving in water telluric acid, possibly adding phosphoric acid, preparing an ammonium paramolybdate solution, mixing the two solutions together and with titanium dioxide in powder, drying by heating at 80° to 100°C under stirring, extruding or tabletting after addition of a lubricant and possibly of a product (for instance ammonium bicarbonate) capable of giving the desired porosity.

Alternatively the suspension formed by titanium dioxide and by the dissolved compounds of tellurium, molybdenum and phosphorous can be atomized in order to obtain the catalyst in the form suitable to be used in fluid bed.

In all cases the catalyst is activated by calcination in air at a temperature in the range of from 450° to 550°C for a time ranging from ½ an hour to 20 hours and preferably at a temperature ranging from 480°C to 530°C and for a time ranging from 1 hour to 4 hours.

The so obtained catalyst is used for producing nitriles, oxygen containing derivatives, conjugated dienes by operating in fixed or fluid bed according to processes which make use of an olefine, oxygen or a gas containing oxygen and, in the case of nitriles, also of ammonia at a temperature ranging from 350°C to 550°C, preferably from 400°C to 500°C. The process of the invention is particularly useful when the starting olefinic compound is selected between propylene and isobutylene at a more or less high purity grade.

Oxygen is generally introduced as air, for exploiting the advantage of the presence of nitrogen for removing the heat produced in the oxidation reaction.

The molar ratio between the olefine and air in the reaction is in the range of from 1:5 to 1:15 and preferably from 1:10 to 1:13.

Ammonia, when provided, is fed at a molar ratio with respect to the olefine in the range of from 1.5:1 to 0.9:1.

Generally the ammoxidation and oxidation reactions are carried out in presence of steam.

The molar ratio with respect to the olefine, according to which steam is fed, is in the range of from 20:1 to 2:1, depending on the reaction conditions and on the particular considered reaction.

The pressure at which the reactions are carried out ranges from 1 to 5 atmospheres, while the space velocity of the fed olefine is in the range of from 10 to 500 $h^{-1}$, preferably from 50 to 200 $h^{-1}$ wherein for space velocity we mean the volumes of olefine sent to the reactor per volume of catalyst and per hour, said volumes being calculated at room temperature and atmospheric pressure. The invention will now be more clearly and in detail illustrated by the following examples.

It is, anyhow, obvious that many modifications can be effected by the man skilled in the art to the mentioned processes without leaving the ambit and the spirit of the invention.

In the examples the terms conversion and selectivity must be understood as follows:

$$\text{conversion} : \frac{\text{moles of olefine entering the reactor} - \text{moles of olefine leaving the reactor}}{\text{moles of olefine entering the reactor}} \cdot 100$$

$$\text{selectivity} : \frac{\text{moles of obtained final product}}{\text{moles of olefine entering the reactor} - \text{moles of olefine leaving the reacotr}} \cdot 100$$

EXAMPLE 1

57 grams of telluric acid ($H_6TeO_6$) were dissolved in 200 cc of water and 4 grams of phosphoric acid in a solution at 85% were added thereto. Separately 4.4 grams of ammonium paramolybdate were dissolved in 30 cc of water.

The two solutions were joined and to the same 80 grams of titanium dioxide were added.

The whole was dried by heating and under discontinuous stirring.

The mass was activated by calcination at 520°C in air for 3 hours in a muffle.

The mass was ground and the fraction having a granulometry in the range of from 45 to 150 mesh ASTM was utilized.

6 cc of catalyst were put in a microreactor heated by an electric oven. The possibility was foreseen of withdrawing samples of the gases entering and leaving the reactor in order to analyze same by a chromatography device.

By feeding propylene, air, ammonia and water at the molar ratios of 1/12/1.3/10 with the propylene space velocities and the temperatures herein below reported, we obtained the following results:

| Reaction temperature | Propylene space velocity (h$^{-1}$) | Propylene conversion (moles %) | Selectivity to acrylonitrile (moles %) |
|---|---|---|---|
| 465 | 50 | 99 | 81 |
| 475 | 75 | 96 | 80 |

EXAMPLE 2

42 grams of telluric acid ($H_6TeO_6$) were weighed and dissolved in 200 cc of water. Separately 3.2 g of ammonium paramolybdate were dissolved in 20 cc of water.

The two solutions were joined and 60 g of titanium dioxide were added thereto. The whole was dried by heating under continuous, slow stirring. The mass was calcined in a muffle at 500°C for 5 hours in a stream of air. The mass was then ground and, by sieving, the fraction having a granulometry in the range of from 45 to 150 mesh ASTM was separated.

6 cc of catalyst were put in a microreactor and propylene, ammonia, air and water at the molar ratios of 1/1.3/12/10 were fed to the same, the test conditions being the ones referred to in the table wherein there are reported also the obtained results.

| Reaction temperature (°C) | Propylene space velocity (h$^{-1}$) | $C_3H_6$ conversion (moles %) | Selectivity to ACN (moles %) |
|---|---|---|---|
| 475 | 25 | 91 | 80 |
| 465 | 25 | 83.4 | 83 |

EXAMPLE 3

9 grams of ammonium paramolybdate were weighed and dissolved in 100 cc of water. 32 g of metallic tellurium were added, said tellurium being maintained in suspension by strong stirring. The whole was heated at 60°C and 200 cc of 120 volumes hydrogen peroxide were slowly added, letting the temperature be always lower than 95°C.

At last a solution was obtained to which 4 grams of phosphoric acid at 85% were added.

The solution was mixed with 80 g of titanium dioxide and dried by heating under an intermittent stirring.

The catalyst was calcined at 530°C for 3 hours in a muffle in a stream of air.

6 cc of catalyst having a granulometry in the range of from 45 to 150 mesh ASTM were put in a microreactor to which propylene, ammonia, air and water were fed at molar ratios of 1/1.3/11.5/10. The test conditions and the results are reported in the following table.

| Reaction temperature (°C) | Propylene space velocity (h$^{-1}$) | Propylene conversion (moles %) | Selectivity to ACN (moles %) |
|---|---|---|---|
| 475 | 50 | 79 | 88 |
| 460 | 25 | 97 | 82 |

EXAMPLE 4

280 grams of a $TiCl_3$ solution at 15% were weighed and titanium was precipitated by addition of 150 cc of ammonium hydroxide at 32% and 10 cc of hydrogen peroxide at 35%.

The precipitate was filtered and thrice washed with 100 cc of ammoniacal water (1% of $NH_3$).

Separately 10 g of telluric acid ($H_6TeO_6$) were dissolved in 10 cc of water. 1.9 grams of ammonium paramolybdate and 0.3 grams of phosphoric acid at 85% were added thereto.

The resulting solution was joined to the precipitate before prepared and homogenized by stirring.

The whole was dried by heating and then calcined for 2 hours at 520°C in a stream of air in a muffle.

The fraction having a granulometry in the range of from 45 to 150 mesh ASTM was collected and 6 cc of said fraction were put in a microreactor.

Propylene, ammonia, air and water at the molar ratios of 1/1.3/12/10 were fed at the test conditions referred to in the table, wherein there are reported also the obtained results.

| Reaction temperature (°C) | $C_3H_6$ space velocity (h$^{-1}$) | Propylene conversion (moles %) | Selectivity to acrylonitrile (moles %) |
|---|---|---|---|
| 475 | 50 | 81 | 80 |
| 470 | 25 | 99 | 82 |

EXAMPLE 5

A catalyst was prepared according to the procedure described in example 4. However use was made of 490 grams of a TiCl$_3$ solution at 15%, of 300 cc of ammonium hydroxide at 32% and of 10 cc of 120 volumes hydrogen peroxide. All other quantities of reagents were the same. In the reaction of ammoxidation of propylene effected at the experimental conditions reported in the table and with a feed molar ratio among propylene, air and water equal to 1/1.3/11/10, the results reported in the table were obtained.

| Reaction temperature (°C) | Propylene space velocity | $C_3H_6$ conversion (moles %) | Selectivity to ACN (moles %) |
|---|---|---|---|
| 475 | 50 | 66 | 75 |
| 465 | 25 | 97 | 77 |

EXAMPLE 6

38 grams of telluric acid were dissolved in 150 cc of water and were joined to a solution prepared starting from 3 grams of ammonium paramolybdate, 4 grams of phosphoric acid in solution at 85% and 50 cc of water.

The resulting solution was poured in 200 cc of silica sol "LudoxA.S." having 30% of SiO$_2$ content.

The whole was dried by heating under stirring and subsequently was calcined in a muffle at 520°C for 3 hours in a stream of air.

6 cc of catalyst having a granulometry in the range of from 45 to 150 mesh were withdrawn and introduced into a microreactor whereto propylene, ammonia, air and water were fed at molar ratios equal to 1/1.3/12/10.

At the aforesaid experimental conditions we obtained the results listed in the table.

| Reaction temperature (°C) | $C_3H_6$ space velocity (h$^{-1}$) | $C_3H_6$ conversion (moles %) | Selectivity to ACN (moles %) |
|---|---|---|---|
| 465 | 50 | 98 | 60 |
| 470 | 75 | 96 | 56 |

This example shows how catalytic compositions without titanium give remarkable lower results as to selectivity to acrylonitrile.

The introduction of the silica carrier is due to the fact that the catalytic composition is not in the solid state at the reaction temperature and a vitrous mass forms which clogs the reactor.

EXAMPLE 7

A catalyst was prepared according to the procedure described in example 6. The same quantities of reagents were used but instead of silica sol "Ludox" use was made of 60 grams of α-alumina.

In the ammoxidation reaction of propylene at the same experimental conditions referred to in example 6 the results reported in the following table were obtained.

| Reaction temperature (°C) | $C_3H_6$ space velocity (h$^{-1}$) | $C_3H_6$ conversion (moles %) | Selectivity to ACN (moles %) |
|---|---|---|---|
| 460 | 25 | 56 | 58 |
| 475 | 12.5 | 80 | 58 |

This example shows, as the preceding one, that the performances of the catalyst are connected to the presence of titanium.

Its substitution with aluminium oxide causes a drastic selectivity lowering.

EXAMPLE 8

The catalysts prepared according to examples 2, 4 and 7 were used in the reaction of oxidation of propylene to acrolein. 6 cc of catalyst were put in a microreactor.

The temperature was raised to the desired value by sending only air through the reactor at a space velocity of 600 cc per cc of catalyst per hour. Afterwards also propylene and steam were fed.

Reaction conditions and obtained results are synthetically listed in the table.

| Catalyst | $C_3H_6$/air/water molar ratios | Reaction temperature (°C) | Propylene space velocity (h$^{-1}$) | $C_3H_6$ conversion (moles %) | Selectivity to Acrolein (moles %) |
|---|---|---|---|---|---|
| As in example 2 | 1/12/7 | 450 | 50 | 73 | 81 |
| As in example 4 | 1/12/8 | 445 | 50 | 80 | 95 |
|  | 1/13.5/8 | 465 | 50 | 92 | 85 |
| As in example 7 | 1/12/7 | 450 | 25 | 63 | 70 |

EXAMPLES 9 to 18

32 grams of telluric acid (H$_6$TeO$_6$) were dissolved in 150 cc of water and 2.3 grams of phosphoric acid in solution at 85% were added thereto. Separately 2 grams of ammonium paramolybdate were dissolved in 30 cc of water.

A third solution was prepared by dissolving in 100 cc of water in the case of example 9 2.4 g of silver nitrate in the case of example 10 4.2g of zinc nitrate, in the case of example 11 3.8 g of cadmium acetate, in the case of example 12 5.3 g of aluminium nitrate, in the case of example 13 6.1 g of cerium nitrate, in the case of example 14 6 g of zirconium nitrate, in the case of example 15 5 g of a solution at 50% of manganese nitrate, in the case of example 16 5.6 g of iron nitrate, in the case of example 17 4.1 g of cobalt nitrate, in the case of example 18 4.1 g of nickel nitrate.

The three solutions were joined and 50 g of titanium dioxide were added. The whole was dried by heating under continuous stirring. The obtained product was calcined at 500°C in air for 4 hours in a muffle. The mass was ground and the fraction with a granulometry in the range of from 45 to 150 mesh ASTM was tested in the ammoxidation reaction of propylene, by working as reported in example 1.

The results are listed in the following table.

| EXAMPLE | Elements constituting the catalyst | Propylene space velocity (h$^{-1}$) | Reaction temperature (°C) | $C_3H_6$ conversion (moles %) | Selectivity to ACN (moles %) |
|---|---|---|---|---|---|
| 9  | Ag-Te-Ti-Mo-P-O | 50 | 467 | 92.2 | 77.4 |
| 10 | Zn-Te-Ti-Mo-P-O | 25 | 460 | 91.5 | 83.8 |
| 11 | Cd-Te-Ti-Mo-P-O | 50 | 470 | 89.8 | 78.1 |
| 12 | Al-Te-Ti-Mo-P-O | 50 | 465 | 95.5 | 78.4 |
| 13 | Ce-Te-Ti-Mo-P-O | 50 | 460 | 96   | 76   |
| 14 | Zr-Te-Ti-Mo-P-O | 50 | 470 | 84   | 83.2 |
| 15 | Mn-Te-Ti-Mo-P-O | 40 | 465 | 89.4 | 80   |
| 16 | Fe-Te-Ti-Mo-P-O | 25 | 465 | 94   | 78   |
| 17 | Co-Te-Ti-Mo-P-O | 25 | 475 | 94.7 | 78.3 |
| 18 | Ni-Te-Ti-Mo-P-O | 25 | 465 | 71.4 | 81.4 |

What we claim are:

1. A process for the ammoxidation of propylene to acrylonitrile characterized in that the reaction is carried out in the presence of a catalyst $TeTi_nMo_pP_qX_mO_r$ which consists essentially of the reaction product of (1) a member selected from the group consisting of telluric acid, metallic tellurium, and telluric oxide; (2) a member selected from the group consisting of titanium dioxide, titanium trichloride and titanium tetrachloride; (3) a member selected from the group consisting of ammonium molybdate and ammonium paramolybdate; (4) phosphoric acid; and (5) wherein X is a member selected from the group consisting of the nitrates, acetates, carbonates and bicarbonates of silver, zinc, cadmium, aluminum, cerium, lanthanum, zirconium, manganese, iron, cobalt and nickel and m is between 0 and 0.3, n is between 1 and 15, p is between 0.05 and 0.4, q is between 0 and 0.3 and r has the value necessary for satisfying the valence with which the various elements are present in the formula, with the proviso that when $q$ or $m$ or $q$ and $m$ are zero the corresponding phosphoric acid or X member or phosphoric acid and X member, respectively, are omitted, said reaction product being obtained by first admixing the components in water and thereafter drying the mixture to obtain the reaction product.

2. A process for the ammoxidation of propylene to acrylonitrile according to claim 1 characterized in that the reaction is carried out at a temperature in the range of from 350°C to 550°C.

3. A process for the ammoxidation of propylene to acrylonitrile according to claim 1 characterized in that the reaction is carried out at a temperature in the range of from 400°C to 500°C.

4. A process for the ammoxidation of propylene to acrylonitrile according to claim 1 characterized in that the reaction is carried out by feeding propylene, air and ammonia with a propylene/air ratio in the range of from 1:5 to 1:15 and the propylene/ammonia ratio being in the range of from 1:1.5 to 1:0.9.

5. A process for the ammoxidation of propylene to acrylonitrile according to claim 1 characterized in that the reaction is carried out in the presence of steam at a molar ratio of steam to propylene of from 20:1 to 2:1.

6. A process for the ammoxidation of propylene to acrylonitrile according to claim 1 characterized in that the reaction is carried out at a pressure in the range of from atmospheric pressure to 5 atmospheres.

7. A process for the ammoxidation of propylene to acrylonitrile which comprises passing propylene, air and steam over a catalyst which consists essentially of $TeTi_nMo_pP_qX_mO_r$, said catalyst being the reaction product of:
1. a member selected from the group consisting of telluric acid, metallic tellurium and telluric oxide;
2. a member selected from the group consisting of titanium dioxide, titanium trichloride and titanium tetrachloride;
3. a member selected from the group consisting of ammonium molybdate and ammonium paramolybdate;
4. phosphoric acid;
5. wherein X is a member selected from the nitrates, acetates, carbonates and bicarbonates of silver, zinc, cadmium, aluminum, cerium, lanthanum, zirconium, manganese, iron, cobalt and nickel and m is between 0 and 0.3, n is between 1 and 15, p is between 0.05 and 0.4, q is between 0 and 0.3 and r has the value necessary for satisfying the valence with which the various elements are present in the formula, said process being carried out at a temperature of from 350°C to 550°C and at a pressure from atmospheric to 5 atmospheres, the propylene to air ratio being in the range of 1:5 to 1:15, the propylene to ammonia ratio being 1:1.5 to 1:0.9 and the propylene to steam ratio is from 20:1 to 2:1, with the proviso that when $q$ or $m$ or $q$ and $m$ are zero the corresponding phosphoric acid or X member or phosphoric acid and X member, respectively, are omitted, said reaction product being obtained by first admixing the components in water and thereafter drying the mixture to obtain the reaction product.

* * * * *